United States Patent [19]

Campion et al.

[11] 4,219,253
[45] Aug. 26, 1980

[54] SCREEN

[75] Inventors: John S. Campion, 667 W. Wrightwood, Addison, Ill. 60101; Gerald D. Stewart, Addison, Ill.

[73] Assignee: John S. Campion, Addison, Ill.

[21] Appl. No.: 962,200

[22] Filed: Nov. 20, 1978

[51] Int. Cl.² ............................................ G03B 21/60
[52] U.S. Cl. .................................................. 350/129
[58] Field of Search ............... 350/127, 128, 129, 167

[56] References Cited
U.S. PATENT DOCUMENTS

| | | | |
|---|---|---|---|
| 2,150,225 | 3/1939 | Kaszab | 350/128 |
| 2,351,032 | 6/1944 | Gabor . | |
| 2,351,033 | 6/1944 | Gabor . | |
| 2,351,034 | 6/1944 | Gabor . | |
| 2,510,344 | 6/1950 | Law | 350/128 |
| 3,357,772 | 12/1967 | Rowland | 350/167 |
| 3,357,773 | 12/1967 | Rowland | 350/167 |
| 4,054,907 | 10/1977 | Itoh et al. | 350/128 X |

Primary Examiner—Richard A. Wintercorn
Attorney, Agent, or Firm—Kinzer, Plyer, Dorn & McEachran

[57] ABSTRACT

A rear projection screen for a projection television. The screen includes a pair of plastic sheets, each having lenticular embossments on one side thereof. The embossments are arranged in rows in one direction and alternate embossments are staggered in the opposite direction. The plastic sheets are positioned back-to-back with their lenticular embossed sides facing outwardly. The sheets are oriented with the machine direction of one sheet extending at right angles to the machine direction of the other sheet. The plastic sheets are separated either by glass or can be laminated to a transparent plastic. The lenticular embossments are generally parabolic in shape. Plastic sheets having either approximately 10,000 embossments per square inch or 40,000 lenticular embossments per square inch may be used.

9 Claims, 4 Drawing Figures

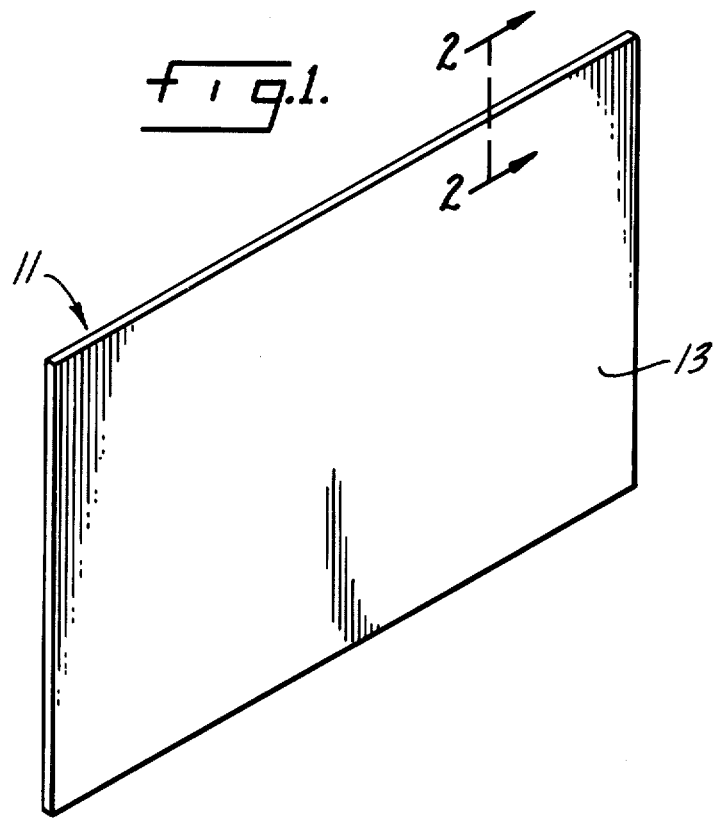
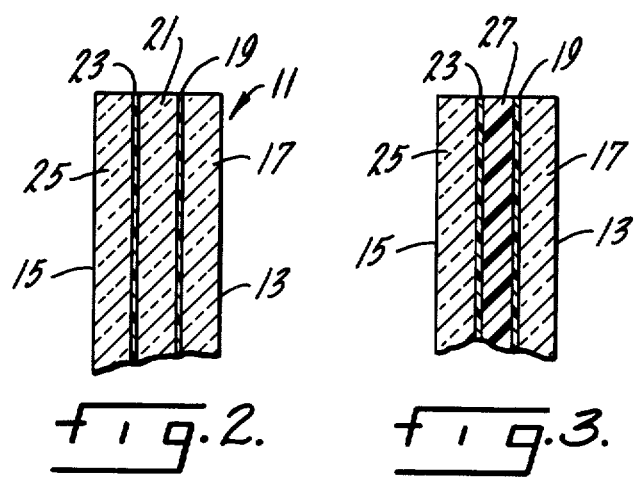

SCREEN

BACKGROUND AND SUMMARY OF THE INVENTION

In recent years, developers of "big screen" television sets have resorted to front projection screens as the viewing portion of their sets even though sets with such screens are not as compact or aesthetically pleasing in appearance as console type rear projection screen television sets. Also, such screens do not present sharp images to viewers who are located off to one side or the other of such a screen. Front projection screens have been used in spite of these faults becuase of the difficulties in developing a sufficiently large rear projection screen which is as clear and sharp as the screen of a standard size commercially available television. The one rear projection "big screen" television which is presently commercially available is not as large or as clear as most of the commercially available front projection "big screens". Further, the brightness of this rear projection screen decreases rapidly as the viewer moves up, down or from side to side relative to the screen.

Accordingly, this invention is concerned with a large rear projection screen suitable for use with "big screen" projection television sets which does not exhibit any of the aforementioned deficiencies.

Another object of this invention is a large rear projection screen which provides a clear, sharp image over a wide viewing angle.

Another object of this invention is a large rear projection screen providing a clear, sharp image over the entire surface of the screen.

Another object of the invention is a large rear projection screen in which the brightness does not change as the viewer changes position up, down or from side to side relative to the screen.

Another object is a large rear projection screen that can be economically manufactured in relatively large sizes.

Another object is a large rear projection screen which does not unduly reduce the brightness of the image projected thereon to enable the screen to be used in rooms with ambient light.

Another object is a large rear projection screen which uses plastic sheets having lenticular embossments thereon.

Other objects may be found in the following specification, claims and drawings.

BRIEF DESCRIPTION OF THE DRAWINGS

The invention is illustrated more or less diagrammatically in the following drawings wherein:

FIG. 1 is a perspective view of a rear projection screen of this invention;

FIG. 2 is a cross-sectional view taken along line 2—2 of FIG. 1;

FIG. 3 is a cross-section view similar to that of FIG. 2 of a modified form of the invention.

DESCRIPTION OF THE PREFERRED EMBODIMENTS

Figure 4:
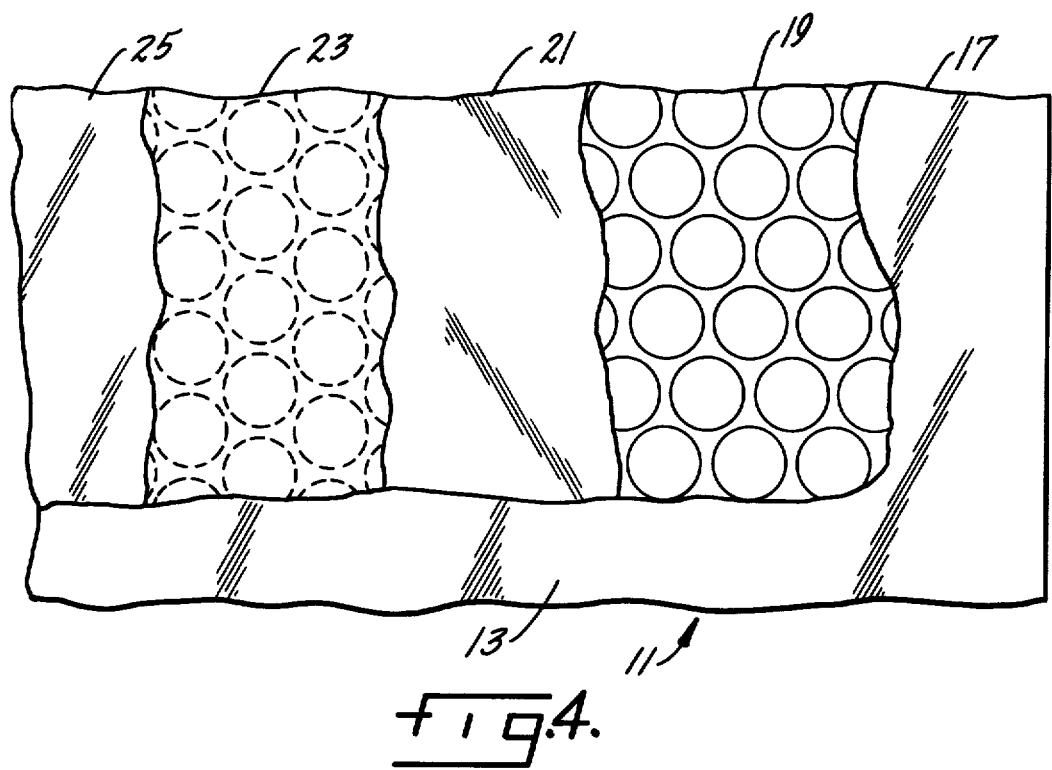
FIG. 4 is a greatly enlarged front plan view of FIG. 1 with portions of each element of the screen broken away to show the structure of the screen in overlapping relationship.

The drawings show a screen 11 constructed in accordance with the teachings of this invention. The screen 11 is intended for use as a rear projection screen in which the images are viewed on the side 13 thereof which is opposite to the side 15 on which the images are projected. While this screen is suitable for use with almost any type of projector, it is particularly intended for use with projection television equipment. The projection television equipment used with this screen can either be a standard 13 or 15 inch color television receiver equipped with a lens that enlarges and projects the image on the screen, or three separate picture tubes—red, blue and green which blend on the screen to produce a full range of colors. The projection television equipment is preferably installed in a cabinet with the screen 11 closing an opening into the cabinet.

As is shown in FIG. 2, the screen 11 includes five elements sandwiched together. The five elements would conveniently be held together by a frame or bezel which also would function to support the screen in a cabinet. However, the frame has been omitted for clarity of illustration in the drawings.

The elements of the screen listed in order from the viewing side 13 to the projection side 15 include a sheet of non-glare glass 17, a plastic sheet 19, a sheet of glass 21, a plastic sheet 23 and a sheet of glass 25. The sheets of glass may be ordinary glass, for example, glass having a thickness of approximately 1/16 inch. Tempered glass may be used in place of ordinary glass, if necessary or desirable, for safety reasons.

The plastic sheets 19 and 23 may be formed of polyvinylchloride having lenticular embossments or lenses on one surface thereof. The density of embossments may be varied in accordance with operating conditions. Plastic sheets having either approximately 10,000 or approximately 40,000 lenses per square inch which are commercially available from Rowland Development Corporation, Wallingford, Connecticut under the trademark "ROWLUX" may be used. These commercially available sheets have a thickness of approximately 0.005 inches. The lenses of these sheets are parabolic in shape and are arranged in rows in one direction with alternate lenses being staggered in the opposite direction as shown in FIG. 4. Conventionally, the plastic sheets are considered as having a machine direction and a transverse direction.

In assembling the screen, the plastic sheets are oriented so that the machine direction of one sheet extends at right angles to the machine direction of the other plastic sheet as shown in FIG. 4. Also, the lenticular surfaces of the sheets are positioned to face away from each other.

In a modified embodiment of the invention, the glass sheet 21 may be replaced by a plastic sheet 27 of suitable thickness and composition. The lenticular sheets 19 and 23 may be adhered to a plastic sheet in any suitable manner to form a laminated structure. FIG. 3 of the drawings shows such a modified construction in which the plastic sheets 19 and 23 having lenticular embossments on surface of each are laminated to a polyvinylchloride sheet 27 having a thickness of 0.005 inch. Plastic sheets of other thicknesses may also be used. The thickness of the sheet 27 is exaggerated relative to the sheets 19 and 23 for clarity of illustration. The lenticular embossed plastic sheets 19 and 23 are oriented so that the machine direction of one sheet extends at right angles to the machine direction of the other sheet.

We claim:

1. A rear projection screen for projection television, said screen including:
   a pair of plastic sheets, each sheet having generally parabolic lenticular embossments on only one side thereof with each sheet having a similar pattern of embossments,
   said plastic sheets being positioned back to back with their lenticular embossed sides facing outwardly, and
   transparent means separating said plastic sheets.

2. The screen of claim 1 in which said pattern includes embossments arranged in rows in one direction and alternate embossments being staggered in the opposite direction.

3. The rear projection screen of claim 1 in which said plastic sheets are sandwiched between sheets of glass with the sheet of glass on the viewer side of the screen being non-glare.

4. The rear projection screen of claim 1 in which said plastic sheets are polyvinylchloride.

5. The rear projection screen of claim 1 in which each plastic sheet has approximately 10,000 lenticular embossments per square inch.

6. The rear projection screen of claim 1 in which each plastic sheet has approximately 40,000 lenticular embossments per square inch.

7. The rear projection screen of claim 1 in which said transparent means separating said plastic sheets is glass.

8. The rear projection screen of claim 1 in which said transparent means separating said plastic sheets is a plastic sheet.

9. The screen of claim 2 in which said plastic sheets are oriented with the machine direction of one sheet extending at right angles to the machine direction of the other sheet.

* * * * *